(12) United States Patent
Ryan

(10) Patent No.: US 8,700,450 B2
(45) Date of Patent: Apr. 15, 2014

(54) CUSTOMER RELATIONSHIP MANAGEMENT SYSTEM AND METHOD

(75) Inventor: Patrick Nicholas Ryan, Wellington (NZ)

(73) Assignee: Bally Gaming, Inc., Las Vegas, NV (US)

( * ) Notice: Subject to any disclaimer, the term of this patent is extended or adjusted under 35 U.S.C. 154(b) by 933 days.

(21) Appl. No.: 12/137,514

(22) Filed: Jun. 11, 2008

(65) Prior Publication Data

US 2009/0030790 A1  Jan. 29, 2009

Related U.S. Application Data

(63) Continuation of application No. 10/078,642, filed on Feb. 19, 2002.

(51) Int. Cl.
*G06Q 30/00* (2012.01)

(52) U.S. Cl.
USPC ........................................................ 705/14.1

(58) Field of Classification Search
USPC ........................................................ 705/14.1
See application file for complete search history.

(56) References Cited

U.S. PATENT DOCUMENTS

| | | |
|---|---|---|
| 4,404,589 A | 9/1983 | Wright, Jr. |
| 5,164,983 A | 11/1992 | Brown et al. |
| 5,974,396 A | 10/1999 | Anderson et al. |
| 6,049,778 A | 4/2000 | Walker et al. |
| 6,138,139 A | 10/2000 | Beck et al. |
| 6,308,202 B1 | 10/2001 | Cohn et al. |
| 6,522,875 B1 | 2/2003 | Dowling et al. |
| 6,571,279 B1 | 5/2003 | Herz et al. |
| 6,941,573 B1 * | 9/2005 | Cowan et al. ................. 725/9 |

FOREIGN PATENT DOCUMENTS

| | | |
|---|---|---|
| WO | 9715023 | 4/1997 |
| WO | 9904350 | 1/1999 |
| WO | 0029973 | 5/2000 |

* cited by examiner

*Primary Examiner* — Daniel Lastra
(74) *Attorney, Agent, or Firm* — Brooke Quist; Marvin Hein

(57) ABSTRACT

A customer relationship management system, the system comprising: a memory that includes an interaction database of interaction data, wherein the interaction data is related to interactions between customers and merchants; a data retrieval system, wherein the data retrieval system accesses data from the memory, based on a set of criteria, and defines a promotional group subset of the customers stored in the interaction database to which promotional efforts are directed and a control group subset of the customers stored in the interaction database to which promotional efforts are not directed, the target group and the control group are mutually exclusive, and wherein the target group of customers and the control group of customers are based on the same set of criteria other than promotional efforts, which enables the control group to be useful in assessing effectiveness of the promotional efforts; a promotion analyzer, wherein the promotion analyzer enables retrieval of data from the interaction database related to interactions involving customers in the promotional group; and a display for presenting a representation of the retrieved interaction data.

17 Claims, 16 Drawing Sheets

FIG. 4

Group Definition Step 1 - Select age group

Group Summary

Name    New Group1
age     dont care
sex     dont care
spend   dont care
visit frequency  dont care
area    dont care Group Percentage

100%

☐ 0 Others
☐ 100 NewGroup

Others 0%

Is there a particular age group you'd like to zero in on?

Select an Age Group 1

Select an age range from the drop down list or go to the next record screen if you don't care about the ages of the people in this group.

Age

| dont care |
| dont care |
| under 21 |
| 21..27 |
| 28..32 |
| 33..40 |
| 41..50 |
| 51..60 |
| 61..70 |

« Prev.   Next »   Finish   Cancel

FIG. 11

| Loyalty Manager | | | | | □ □ ☒ |
|---|---|---|---|---|---|
| File Edit Manage Help | | | | | |

Campaign

| Category ID | 4 | Cost per Item | Cost per Item | Central Group | Western Suburbs | | 11 | 1 |
|---|---|---|---|---|---|---|---|---|
| Description | First Promotion | $12.00 | $56.00 | | test1 | | | |
| Explanation | This is a test promotion | $12.00 | $56.00 | | | | 0 | 0 |
| Notes | These are notes | $12.00 | $56.00 | | | | 0 | 0 |
| Default No. | 3 | $12.00 | $56.00 | | | | 0 | 0 |
| Default Begin Date | 8/14/99 | | | | | | | |
| Default End Date | 9/2/99 | | | | | | | |
| FixedCosts | $34.00 | | | | | | | |
| Defaultcostperitem | $55.00 | | | | | | | |

352

□ 36,361 new one two
□ 36,366 new one
□ 36,386 second promotion
□ 36,397 First Promotion
□ 36,404 First Promotion

354

350

CUSTOMER RELATIONSHIP MANAGEMENT SYSTEM AND METHOD

CROSS-REFERENCE TO RELATED APPLICATIONS

This application is a continuation of U.S. patent application Ser. No. 10/078,642 filed Feb. 19, 2002, entitled CUSTOMER RELATIONSHIP MANAGEMENT SYSTEM AND METHOD, all of which are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The invention relates to a customer relationship management system and method.

BACKGROUND

The low cost of data storage hardware has led to the collection of large volumes of data. Merchants, for example, generate and collect large volumes of data during the course of their business. To compete effectively, it is necessary for a merchant to be able to identify and use information hidden in the collected data. The task of identifying this hidden information has proved very difficult for merchants.

In the case a promotional campaign on an existing customer database, it is often very difficult for a merchant to estimate the effectiveness of the promotional campaign. In many cases, the merchant needs to run several complicated queries on a customer database and so requires vast technical knowledge to formulate the appropriate queries.

Similarly, understanding the changes ill behaviour of different customer demographics can be a difficult task, and without such understanding an effective promotional campaign cannot be systematically formulated.

SUMMARY

In broad terms in one form the invention comprises a customer relationship management system comprising a memory in which is maintained an interaction database of interaction data representing interactions between customers and merchants; retrieval means arranged to retrieve, based on a set of criteria, a promotional group subset of the customers stored in the interaction database; promotion analyser arranged to retrieve from the interaction database data representing interactions involving customers in the promotional group; and display means arranged to display a representation of the retrieved interaction data.

In broad terms still another form of the invention comprises a method of managing customer relationships comprising the steps of maintaining in a memory an interaction database of interaction data representing interactions between customers and merchants; retrieving, based on a set of criteria, a promotional group subset of the customers stored in the interaction database; retrieving from the interaction database data representing interactions involving customers in the promotional group; and displaying a representation of the retrieved interaction data.

In another form in broad terms the invention comprises a customer relationship management computer program comprising an interaction database of interaction data representing interactions between customers and merchants maintained in a memory; retrieval means arranged to retrieve, based on a set of criteria, a promotional group subset of the customers stored in the interaction database; promotion analyser arranged to retrieve from the interaction database data representing interactions involving customers in the promotional group; and display means arranged, to display a representation of the retrieved interaction data.

Further aspects, features and advantages of various embodiments of the invention will be apparent from the following detailed disclosure, taken in conjunction with the accompanying sheets of drawings.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 4 illustrates a screen shot showing use of the preferred promotion manager of FIG. 2;

FIG. 11 illustrates a campaign screen;

DETAILED DESCRIPTION

Figure 1:
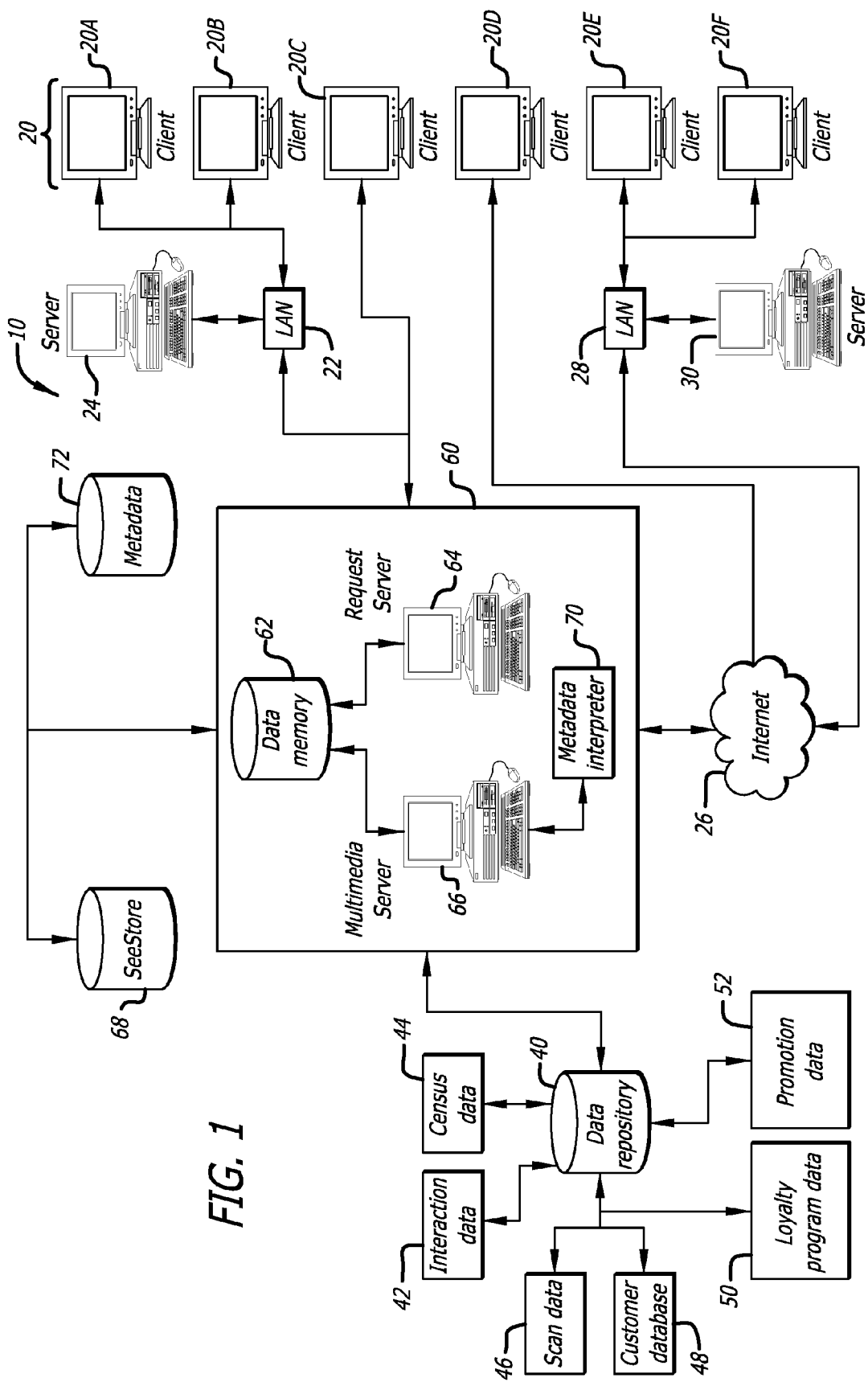
FIG. 1 illustrates a block diagram of the system in which one form of the invention may be implemented.

FIG. 1 illustrates a block diagram of the preferred system on which one form of the present invention may be implemented. The system includes one or more clients 20 for example 20A, 20B, 20C, 20D, 20E and 20F, which each may comprise a personal computer or workstation described below. Each client is interfaced to the system 10 as shown in FIG. 1. Each client 20 could be connected to the system 10 through a local area network or LAN, or could be connected through the Internet.

Clients 20A and 20B, for example, are connected to a network 22, such as a local area network or LAN. The network 22 could be connected to a suitable network server 24 and communicate with the rest of the system 10 as shown. Client 20C is shown connected directly to the system. Clients 20D, 20E and 20F are shown connected to the system 10 through the Internet 26. Client 20D is shown as connected to the Internet 26 with a dial-up connection and clients 20E and 20F are shown connected to a network 28 such as a local area network or LAN, with the network 28 connected to a suitable network server 30.

The preferred system 10 further comprises a data repository 40, for example a data warehouse maintained in a memory. It is envisaged that the data repository may alternatively comprise a single database, a collection of databases, or a data mart. The preferred data repository 40 includes data from a variety of sources. The data repository may include, for example, interaction data 42 representing interactions between customers and merchants, as will be more particularly described below. The data repository may also include data from other sources, for example census data 44, scan data 46 obtained from scanning barcodes on products, data from merchant customer databases 48, data from merchant loyalty programmes 50 and/or promotion data 52 held by a merchant or other organisation. The preferred data repository 40 could be implemented on an AIX database platform in RDBMS (Sybase adaptive server), Sybase IQ and/or SQS.

One preferred form of the system 10 further comprises an application server platform interfaced to the data repository 40 via a Gigabit network. The server platform 60 preferably operates under Windows NT or any other suitable operating and application software. The server platform 60 preferably includes a data memory 62, a request server 64 and a multi-media server 66. A user of the system, for example a merchant, could request the creation of a business object which could be a data visualisation in the form of a map or graph. The system 10 preferably includes a specific memory 68 known as a "SeeStore" in which such business object creation requests are placed. The request server 64 is interfaced to the SeeStore 68 and passes the requests on to the multi-media server 66. The multi-media server 66 creates the requested business object and stores this business object in the SeeStore 68. The resulting business objects are then displayed on a client workstation 20, as will be described below.

A further preferred form system 10 includes a metadata interpreter 70 and a memory 72 specific for storing metadata. The metadata store 72 and the metadata interpreter enable the system to be mapped onto diverse business domains, while still presenting a very simple interface to the end user. The combination enables business rules to be encoded in a way which is domain independent.

Figure 2:
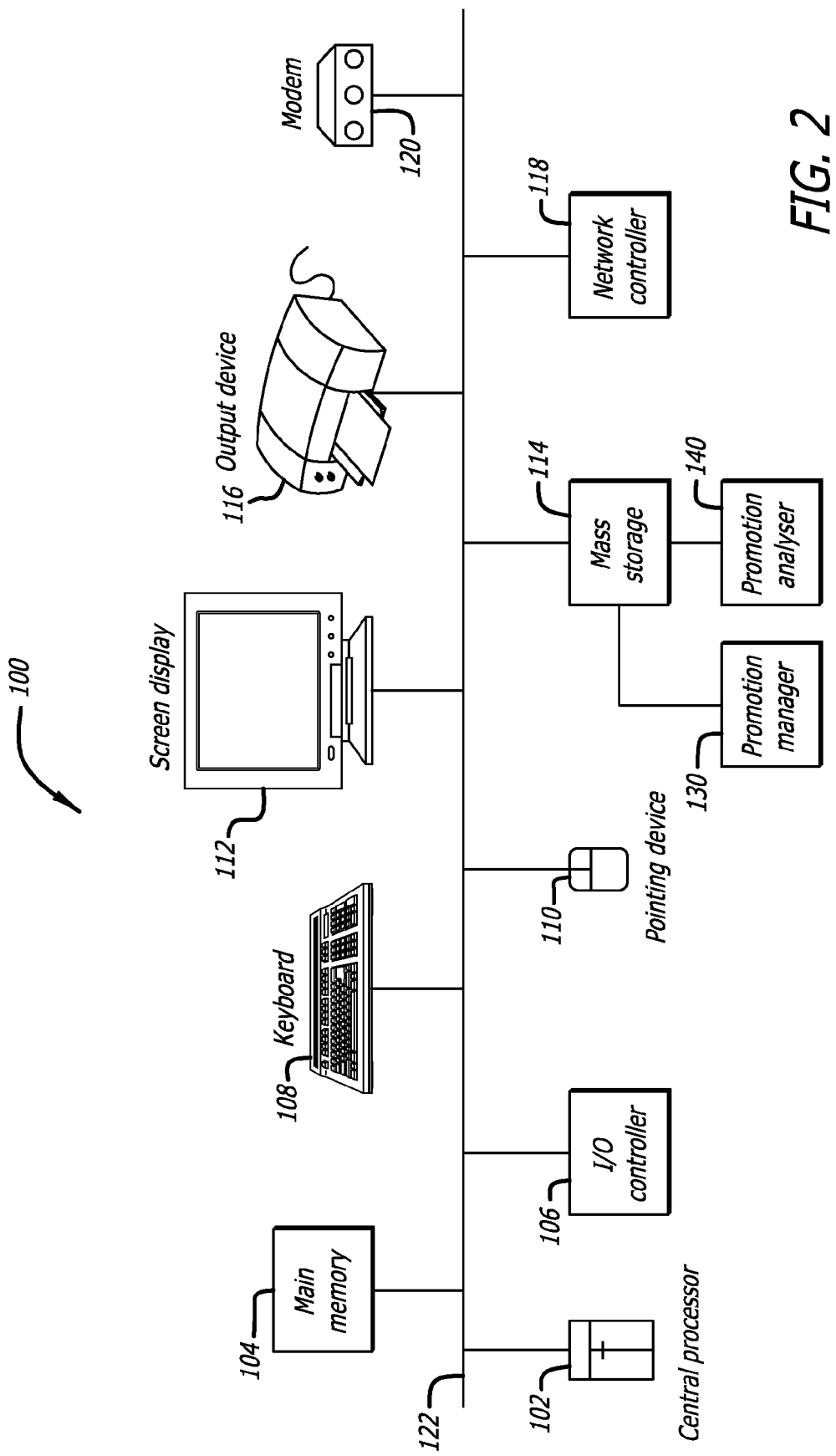
FIG. 2 illustrates the preferred system architecture of hardware on which the present invention may be implemented showing the promotion manager and promotion analyser.

FIG. 2 show the preferred system architecture of a client 20. The computer system 100 typically comprises a central processor 102, a main memory 104 for example RAM and an input/output controller 106. The computer system 100 also comprises peripherals such as a keyboard 108, a pointing device 110 for example a mouse, track ball or touch pad, a display or screen device 112, a mass storage memory 114, for example a hard disk, floppy disk or optical disc, and an output device 116 for example a printer. The system 100 could also include a network interface card or controller 118 and/or a modem 120. The individual components of the system 100 could communicate through a system bus 122.

The preferred client system 100 further comprises a promotion manager 130 and a promotion analyser 140 stored in the mass storage memory 114. The functionality of the promotion manager 130 and promotion analyser 140 is further described below. It is envisaged that the promotion manager 130 and promotion analyser 140 could be installed on individual client machines 20, could be installed on the application server 60 or could be installed on a further server in the system 10.

One form the invention is arranged to display data representing customer relationships involving one or more merchants. Typically, a merchant will operate in a commercial premises or store from which a customer purchases goods or services. The merchant may, for example, operate a petrol station in one or more geographic locations. The merchant may alternatively operate a wagering or betting service, or operate a casino or other gaming facility in which a number of gaming machines and stations are positioned in one or more rooms at a common venue. The merchant may also operate a warehouse facility, manufacturing facility, car parking premises, telecommunications network or web site. The merchant may also offer a range of financial or insurance services.

The merchant does not necessarily need to operate from a commercial premises or store. For example, the merchant may operate from strategically placed machines for example vending machines or amusement machines. The merchant may also operate a mail order catalogue service, operate a cell centre, direct market goods or services, or operate from a website or other electronic medium. It will be appreciated that the nature of business of a merchant includes a wide range of activities. Where the merchant operates retail premises, the merchant may have installed apparatus for-reading the bar codes of products sold. Alternatively, each product may be identified by a code assigned by the merchant which is recorded at the time of sale. Such data is stored in a scan database 46 and could be migrated to the data repository 40. In this way, the record may also include a suitable goods or services identifier, for example a product or service code to identify which goods or services were involved in the interaction.

As a customer interacts with a merchant, the interaction generates interaction data which is then migrated to the data repository 40. The interaction data could be stored in a number of records in a relational database. Each record may include a merchant identifier used to identify a particular merchant, and where a merchant operates from more than one geographic location, the merchant identifier or some other identifier included in the record may identify the geographic location in which the interaction occurs.

The record could also include a customer identifier. The merchant may, for example, issue an incentive-supported customer loyalty card which is then used by the customer during interactions with the merchant. The loyalty card preferably has stored on it a customer identifier and may have stored other data, for example residential address and family size of the customer. Such data is stored in loyalty programme database 50 and could be migrated to the data repository 40.

Where the merchant operates retail premises, the merchant may have installed apparatus for reading the bar codes of products sold. Alternatively, each product may be identified by a code assigned by the merchant which is recorded at the time of sale. Such data is stored in a scan database 46 and could be migrated to the data repository 40. In this way, the record may also include a suitable goods or services identifier, for example a product or service code to identify which goods or services were involved in the interaction.

The record may also include data such as the date and/or time at which the interaction between the customer and merchant took place and/or the cash value of the transaction.

The interaction data is migrated to the data repository 40, generally by way of daily updates or in real time. It is advantageous to cleanse, catalogue and validate the interaction data during migration of the data to the data repository, and this task could be performed by either the merchant or by a third party. Once stored in the data repository 40, the data could be linked to other sources of data for subsequent retrieval, for example the census data 44, scan data 46, data from the merchant customer database 48, data from a merchant loyalty programme 50 and/or promotion data 52 held by the merchant.

The data repository 40 could be maintained by a merchant or alternatively could be maintained by a third party. Updates to the data repository could be carried out by the merchant directly, or alternatively the merchant could provide batched data to a third party for updating the data. Alternatively, a third party could be entrusted with the task of collecting the interaction data and migrating the data to the data repository.

Figure 3:
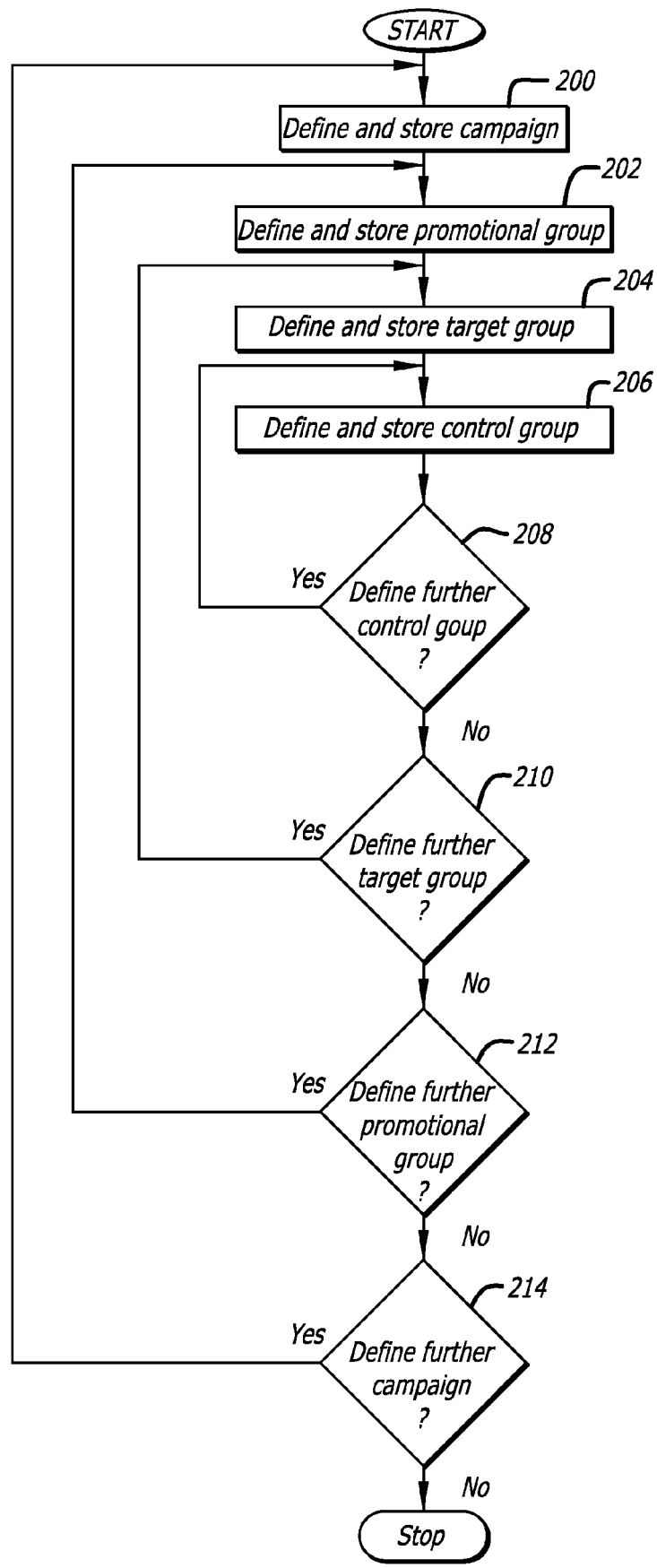
FIG. 3 illustrates of logical flow diagram of the operation of the promotion manager of FIG. 2.

It is good commercial practice for a merchant to conduct campaigns to attract more business from existing customers and also to attract new customers. Referring to FIG. 3, a preferred form of the invention permits a user to define a campaign, indicated at 200. Details of the campaign are stored in memory, for example the SeeStore 68. As shown at 202, the user defines a promotional group as part of the campaign. This promotional group may be selected on characteristics such as age group, gender, and/or other criteria, as will be particularly described below.

It is envisaged that the promotional group could comprise all customers stored in memory having stored transactions with a particular merchant. Alternatively the promotional group could comprise a subset of the group of customers having stored transactions with a particular merchant. Where data involving more than one merchant is slotted in memory, the promotional group could comprise customers having stored transactions with different merchants.

As a further alternative, it is envisaged that the promotional group could include customers not having stored transactions with a particular merchant, for example potential customers. The term "customers" as used in the specification includes potential customers. Once the promotional group has been defined by the user, that promotional group is stored in memory. The system could store, for example, the set of customer identifiers uniquely identifying the set of customers.

Once the promotional group has been identified and stored, the user identifies a subset of the promotional group to which promotional efforts will be directed. This subset is called the target group as indicated at 204. The customer identifiers of customers in the target group are stored in memory.

The target group could comprise the entire promotional group, or it could comprise a subset of the promotional group. In one preferred form the user may be permitted to select the size of the target group, for example. The members of the target group could be selected at random, or could be selected by the user from a list displayed to the user.

Once the target group is identified and stored, the system may define a control group, as indicated at 206. The use of a control group is an optional but highly preferred feature of the invention. The control group is useful in assessing the effectiveness of a campaign, as will be described below.

The control group is a subset of customers in the promotional group which are not in the target group. The control group is preferably identified by a set of customer identifiers and is stored in memory. It is envisaged that the control group will be approximately the same size as the target group. Alternatively, the control group may be larger or smaller than the target group. It is envisaged that the target group and/or control group could be compiled by randomly selecting customers from the promotional group.

The preferred system permits one or more target groups and one or more control groups to be defined and stored for each promotional group, as indicated at 208 and 210. In turn, the preferred system permits one or more promotional groups to be defined and stored for each campaign, as indicated at 212. The user may also select more than one campaign, as indicated at 214.

Once the target group(s) are stored, the user may retrieve successive target groups from memory. Using the customer identifiers from the target group, the system can retrieve further information from memory about each customer, for example contact details, using the customer identifier as a primary key.

The preferred system may permit the user to select a particular target group and then generate a mailing list automatically. It will be appreciated that a single campaign may target distinct promotional groups. These distinct promotional groups may have different demographics and personal characteristics and so promotions may be tailored depending on the characteristics of the individual Promotional groups. For example, a group of elderly women may require a different series of promotional initiatives to another group consisting primarily of young males.

The preferred system provides a simple wizard to assist a user in defining individual promotional groups. This wizard will now be described with reference to FIG. 4 to in a series of seven simple steps.

FIG. 4 shows the window presented to the user when first selecting the wizard. The preferred window comprises a query panel 300, a group summary panel 302, and a group percentage 304. FIG. 4 illustrates the first query presented to the user in the query panel 300. The user is asked whether the user wishes to specify an age group or whether the age group is not important to the user. Preferably, the user is provided with a drop down list box permitting the user to select the appropriate age category.

The group summary panel 302 shows the user which characteristics have been selected to date to define the promotional group. The preferred characteristics are age, sex or gender, spending habits, visit frequency and address mesh block or area. It is envisaged that this list of characteristics may be reduced or may be added to by a user.

Panel 304 shows the percentage of the available customers the new promotional group represents. Initially, the new group represents all available customers. Using the buttons on the navigational panel 306, the user may navigate between the different steps.

Figure 5:
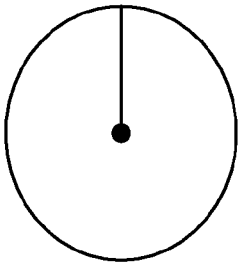
FIG. 5 illustrates a screen shot showing use of the preferred promotion manager of FIG. 2.

As shown in FIG. 5, the age of the group is not important to the user and has not been selected. The information is indicated to the user in the group summary panel in FIG. 5. As shown in FIG. 5, the user may select a particular gender.

Figure 6:
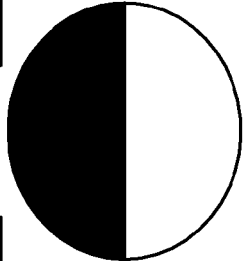
FIG. 6 illustrates a screen shot showing use of the preferred promotion manager of FIG. 2.

Referring to FIG. 6, the user has specified that the promotional group must be males and so this criteria is shown in the group summary panel in FIG. 6. The group percentage panel in FIG. 6 has been updated to show that the current promotional group comprises half of the available customers. The query panel in FIG. 6 allows the user to specify the average amount of money spent per visit by the customer of interest. The categories could be, for example, less than $10, $10-$50, $50-$200, $200-$1,000, $1,000-$10,000 and/or greater than $10,000.

Figure 7:
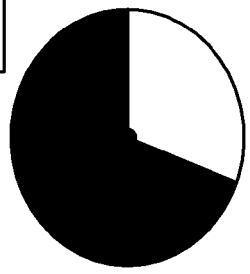
FIG. 7 illustrates a screen shot showing use of the preferred promotion manager of FIG. 2.

Referring to FIG. 7, the user has specified that the promotional group must spend between $10 to $50 on average per visit at the casino. The group summary panel in FIG. 7 is updated to reflect this information and the promotional group now represents 29% of the available customers. The user may specify in the query panel the average number of times individual customers visit the casino. The categories could be, for example, once a year, once every six months, once every three months, once a month, once every two days, once a week, twice a week, once a day and/or twice a day.

Figure 8:
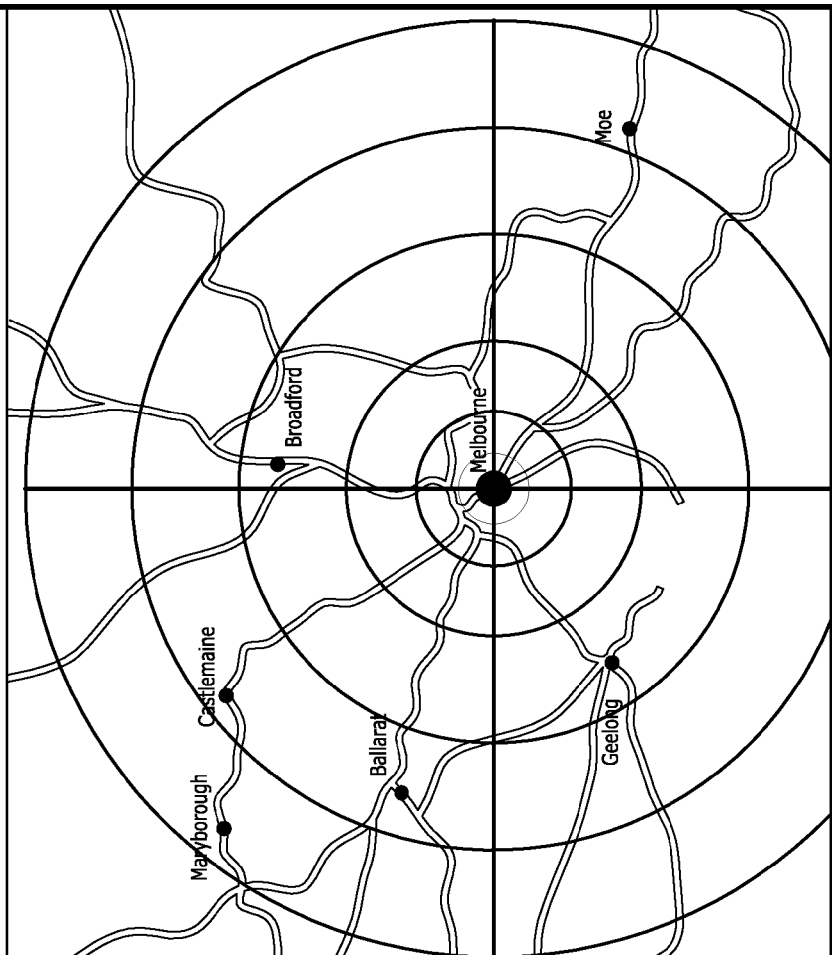
FIG. 8 illustrates a screen shot showing use of the preferred promotion manager of FIG. 2.

Referring to FIG. 8, the group summary panel is updated with the visit frequency specified as once a month and the promotional group now represents 11% of the available customers. The query panel in FIG. 8 displays a topographical map of the region. The preferred map is centred around the location of the casino with areas defined as concentric circles centred on the casino, further divided into quadrants. The user may select one or more areas in the vicinity of the casino by clicking in the area of interest. This selects customers who reside in a particular area, or whose customer provenance is within the selected quadrant.

As shown in FIG. 8, the particular area selected is shaded. It will be appreciated that the user may select more than one area, for example by holding down a control key and clicking in two or more areas. Alternatively, the user may click in one area and drag the cursor over more than one area while holding down the mouse button to select neighbouring sectors. The map may also be provided with scroll bars to permit the use to select areas not immediately visible in the query window. The system may also provide the user with buttons to adjust the scale of the map.

Figure 9:
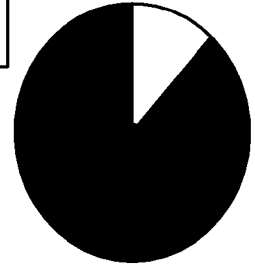
FIG. 9 illustrates a screen shot showing use of the preferred promotion manager of FIG. 2.

As shown in FIG. 9, the user may enter a group description and store this description with the promotional group. For example, there may be some characteristic behaviour which can be associated with the particular group and entering this characteristic behaviour may assist a user to recall the reasons behind selection of the individual characteristics.

Figure 10:
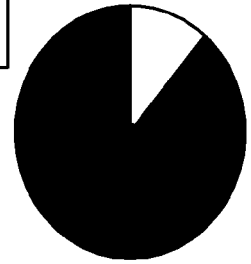
FIG. 10 illustrates a screen shot showing use of the preferred promotion manager of FIG. 2.

As shown in FIG. 10, the user may specify a descriptive name by which to index the group and this descriptive name is updated in the group summary panel.

Referring to FIG. 11, the system provides the user with a campaign screen to allow users to define promotions and associate them with particular campaigns. The campaign screen may comprise, for example, a campaign panel 350, a promotion panel 352 and a graph panel 354 showing graphical representations of individual promotion durations.

Campaign panel 350 may display, for example, a campaign identifier, description explanation and notes relating to the campaign, and other details, for example the beginning and end dates for the campaign. The campaigns are preferably stored in memory and indexed by a campaign identifier.

The promotion panel 352 displays to the user the individual promotions forming part of a particular campaign. The promotion panel in particular displays characteristics of the promotion. Individual promotions are preferably stored in memory, together with and indexed by a promotion identifier and preferably also by a campaign identifier.

The graph panel 354 could display to the user the durations of individual promotions, together with start dates and end dates. The graph panel may include a legend identifying the individual promotions and may also include the promotion identifier (shown as a 5 digit promotion number) and the promotion name.

The campaign window preferably includes navigation buttons shown at the bottom of the screen permitting the user to navigate between promotions and to navigate between campaigns.

Once a campaign has been identified and is under way, it is important for the merchant to monitor the effectiveness of the campaign as a whole and of individual promotions within the campaign. The system provides a promotion analyser to assist the user in this regard.

Figure 12:
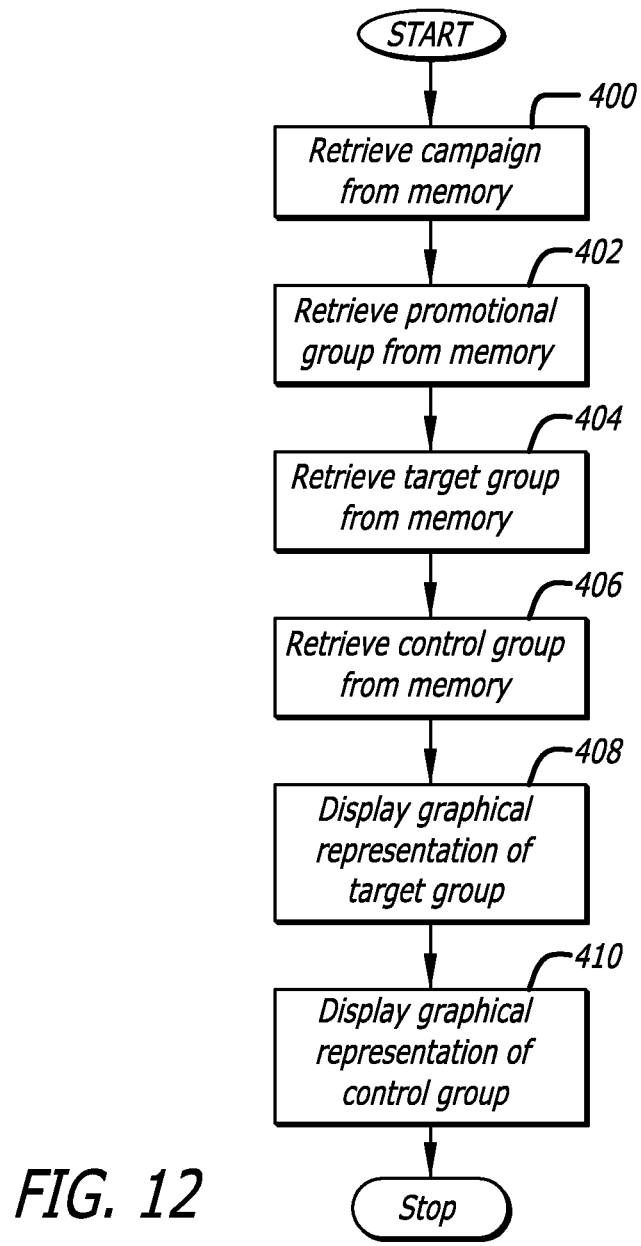
FIG. 12 illustrates of logical flow diagram of the operation of the promotion analyser of FIG. 2.

FIG. 12 illustrates the preferred method followed by the promotion analyser.

The promotion analyser begins by retrieving from memory the campaign to be analysed, indicated generally at 400. Preferably the campaign identifier is used as a primary key to retrieve an individual campaign. Once the campaign has been retrieved from memory, the individual promotions associated with that campaign are also retrieved from memory, indicated at 402.

Target groups and control groups relevant to a particular promotion are then retrieved from memory, as indicated at 404 and 406 respectively.

Figure 13:
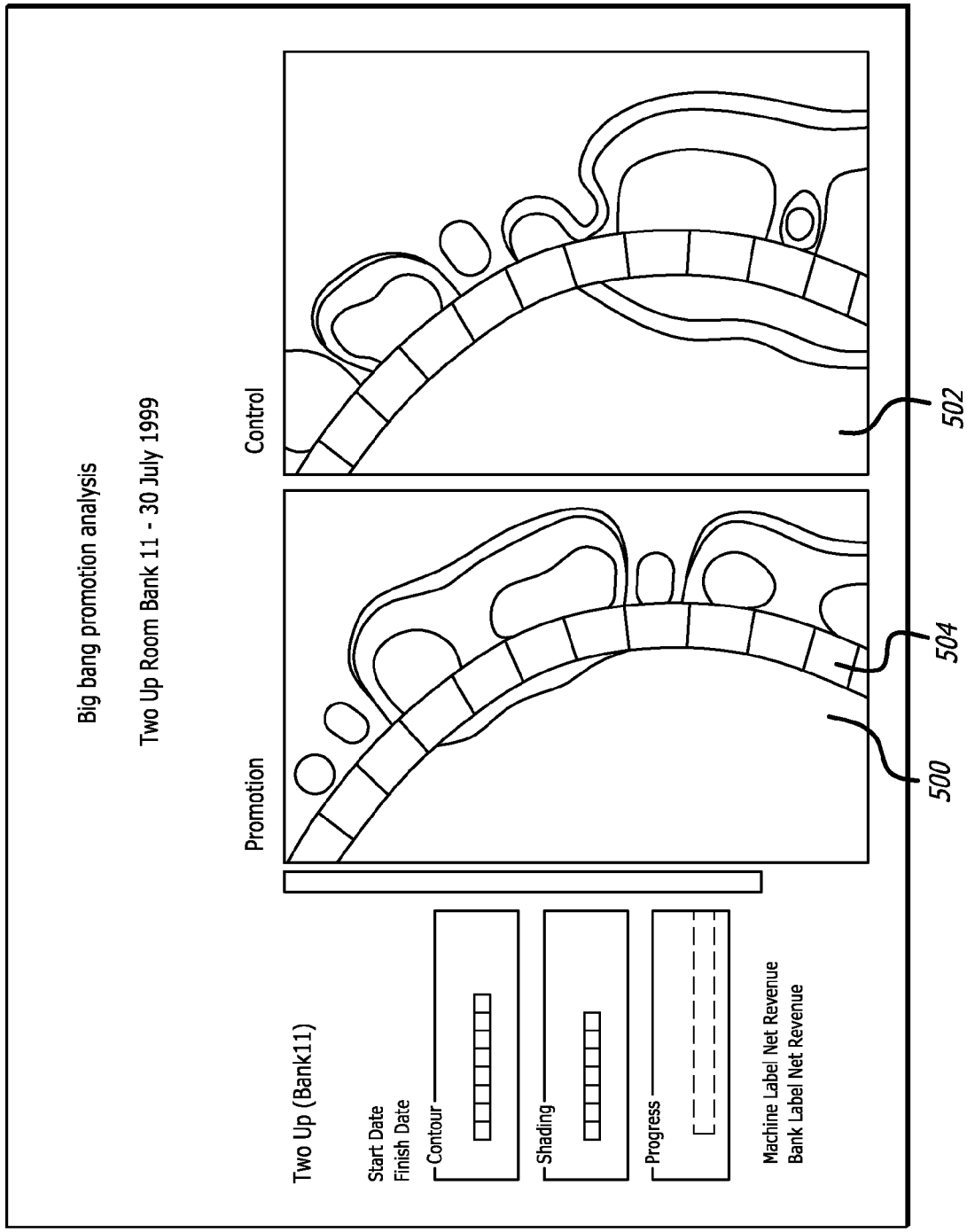
FIG. 13 illustrates a display produced by the promotion analyser of FIG. 2.

Once the target and control groups have been retrieved from memory, representation of the target group and control group are displayed on a client display device as indicated at 408 and 410 respectively. FIG. 13 illustrates how the system, may display representations of the target and control groups. The invention in one preferred form could be arranged to display a contoured representation of data superimposed on a graphical spatial representation of the premises of the merchant generated by the system. Contoured representations are further described in our patent specification PCT/NZOO/00099 to Compudigm International Limited, filed on 14 Jun. 2000 entitled "Data visualisation system and method which is incorporated by reference.

FIG. 13 illustrates on example of a display generated by the system where the merchant operates a casino or similar gaming venue. In this example, a representation of the merchant is generated and displayed in accordance with the invention. The graphical representation comprises a spatial representation of an area of the casino showing the layout of individual gaming machines and stations.

It will be appreciated that where a merchant operates from a retail store, the graphical representation could include a graphical spatial representation of the store. Where the merchant operates from a number of retail stores, the graphical representation could include spatial representations of each store and could also include a large scale map of the geographical area in which the merchant's stores are located.

Where the merchant operates a warehouse, the representations could show the layout of various goods stored by the merchant. Where the merchant provides services, for example financial services, the representations could include schematic representations of the different areas of services offered by the merchant.

Referring to FIG. 13, the system may display a graphical representation of the promotion or target group shown at SOD and may also display graphically a representation of the control group indicated at 502. Panels 500 and 502 show the layout of individual gaming machines, one of which is indicated at 504.

The revenue for each machine is preferably graphically represented adjacent or near to the representation of the individual machine. There are a finite number of machines in the casino, and the individual revenues generated from each machine represent a finite set of data values. These data values are graphically illustrated as data points in the representations SOD and 502.

Using customer identifiers as primary keys, the system retrieves data on each customer from memory. This data could include, for example, dates and times of visits to the casino and details of individual transactions. This data is superimposed on the spatial representation of the casino shown in panels 500 and 502. The preferred system represents these financial details as contours around or adjacent to individual gaming machines. The example provided in FIG. 13, for example, contours the information based on net revenue. This net revenue could be obtained by the sum of the total money spent by individual customers at the casino during the period of interest.

The preferred representations are colour-coded and the value of revenue of each machine is illustrated by representing the corresponding data points in the appropriate colour to represent the correct value of revenue of each machine.

The areas of the representations 500 and 502 around each data point are shown as contours. The nature of the contours for each data point are preferably represented to gradually drop off or fall away from each data point. Each data point could be presented by x and y co-ordinates indicating the relative position of each data point in the presentation. Each data point could also have a z value representing the height or magnitude of the data point. This z value could indicate, for example, the revenue or data value at a particular data point. Each data value is therefore centred on a data point.

Net revenue is one of the key performance indicators (KPI) which may be represented. Other indicators could be turnover, sales, gross profit, net profit, gross margin return on inventory investment (GMROII), net margin return on inventory investment (NMROII), and return on net asset (RONA). A legend may be displayed to the user to assist in clarifying the information presented in panels 500 and 502.

The promotion analyser permits the user to examine a visualisation of interaction data involving customers. This data visualisation is a useful complement to other reporting tools such as the use of charts and graphs. The promotion analyser permits a user to make sense of and obtain useful data without requiring technical knowledge. Patterns in the data can be quickly identified and compared.

For example, by displaying representations of the target group in panel 500 and displaying representations of the control group in panel 502, the user can quickly and readily identify the effects a campaign has had on the behaviour of the customers.

It is envisaged that the system may display to the user snapshots at particular times and dates throughout a particular campaign. The system may alternatively or in addition display to the user animated sequences of customer behaviour over a period selected by the user.

The promotion analyser may also automatically correct for effects external to the promotion. For example, external factors such as school holidays, weather, and the economy in general, may affect the behaviour of individual customers. These factors will affect the customers in a promotional group, whether or not the customer is in a target group.

The promotion analyser may, for example, subtract the weighted effect of the control group in a promotion group from the target group in that promotion group. This removes the noise from the data sample, leaving only data patterns directly attributable to the promotion or campaign.

In some circumstances, a user will wish to identify trends in interactions with customers of a particular demographic category. As described above, the invention enables a promotional group of customers to be defined using a set of criteria. The set of criteria used to define such a group is referred to as a profile. Such a profile could be all females under 21 who are customers of a merchant. Such a profile is an abstract definition of a set of behaviours to which customers may conform in order to qualify for group membership. Alternatively, the profile could be simply a fixed group of customers, changing through time.

The set of customers who are members of a group during a given time period is known as a snapshot of the profile. Such a snapshot could include all members of a given profile interacting with a merchant on a particular day. The invention preferably enables an arbitrary number of snapshots of a profile to be created, and display to a user time series graphs of KPIs associated with the snapshots.

Figure 14:
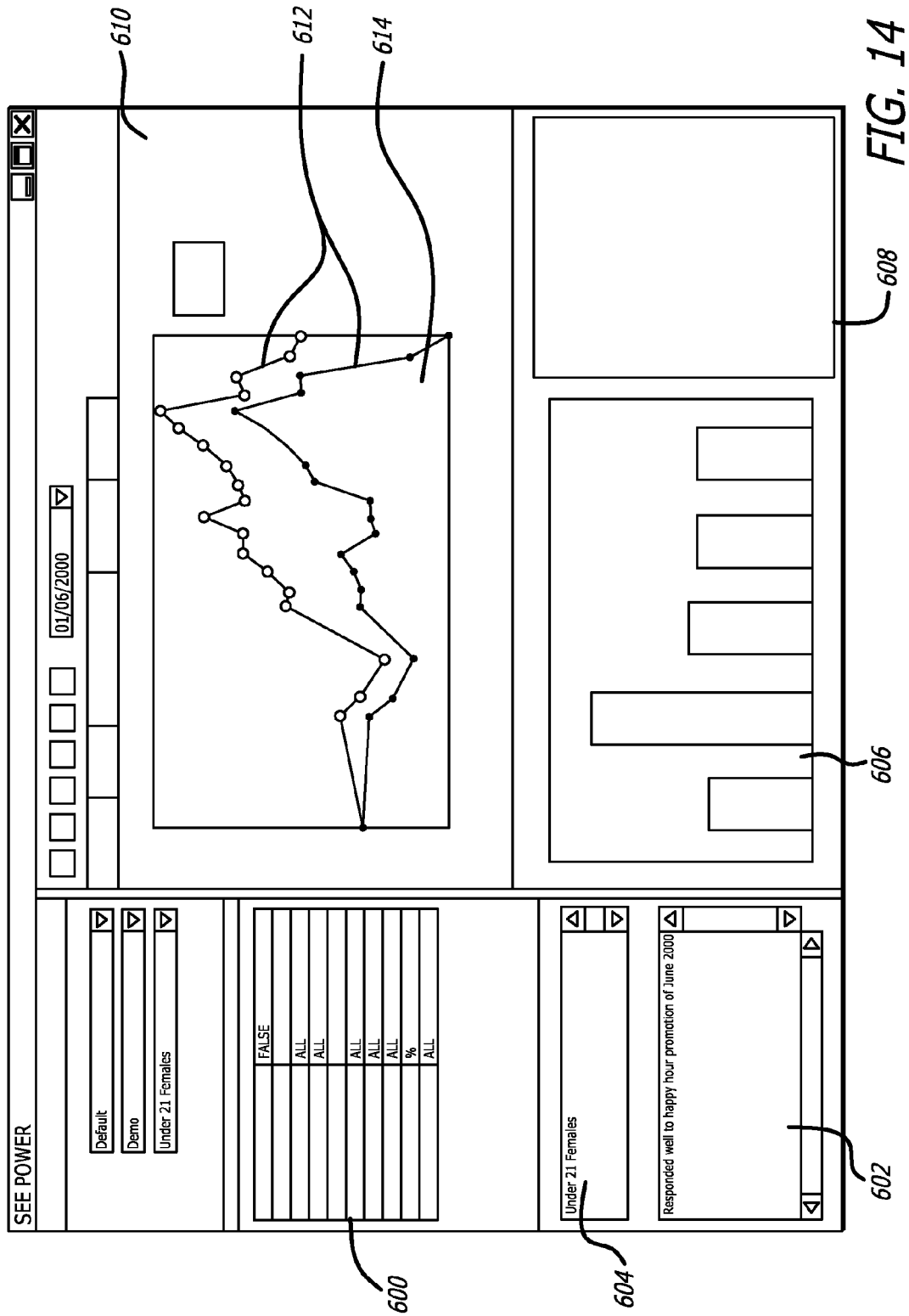
FIGS. 14 to 16 show typical displays generated for a user identifying trends in customer demographic groups.

FIG. 14 illustrates a typical display presented to a user, which would allow a user to quickly identify changing trends within different customer groupings. The invention is preferably arranged to enable a user to define arbitrary events which could be overlayed on the time series graphs, for example promotions or external events which may impact on business KPIs.

FIG. 14 shows two time series graphs for a set of snapshots for a profile of under females who are customers of a particular merchant. The profile criteria are preferably shown in panel 600. The profile criteria have preferably been defined using the Wizard described above with reference to FIGS. 4 to 10. The invention could also display notes regarding the particular profile in panel 602 and a profile description in panel 604.

Panel 606 preferably shows a bar chart containing all the KPIs measured for the currently selected snapshot expressed as a percentage of these KPIs for all customers over the snapshot interval. Such KPIs could include, as shown in FIG. 14, turnover, patron count, trip count, time played and occupancy. The same data could be shown numerically in panel 608.

Display panel 610 graphically displays two KPIs, turnover and trip count. It is envisaged that the user could select other snapshots by using a pointing device to select the appropriate snapshot on the time series charts shown at 612. Shown at 614 is a promotional event instituted by a merchant, for example happy hour. It can be readily identified from the representation shown in FIG. 14 that the customer group in this particular profile shows increased turnover and trip count during the course of the promotion.

Figure 15:
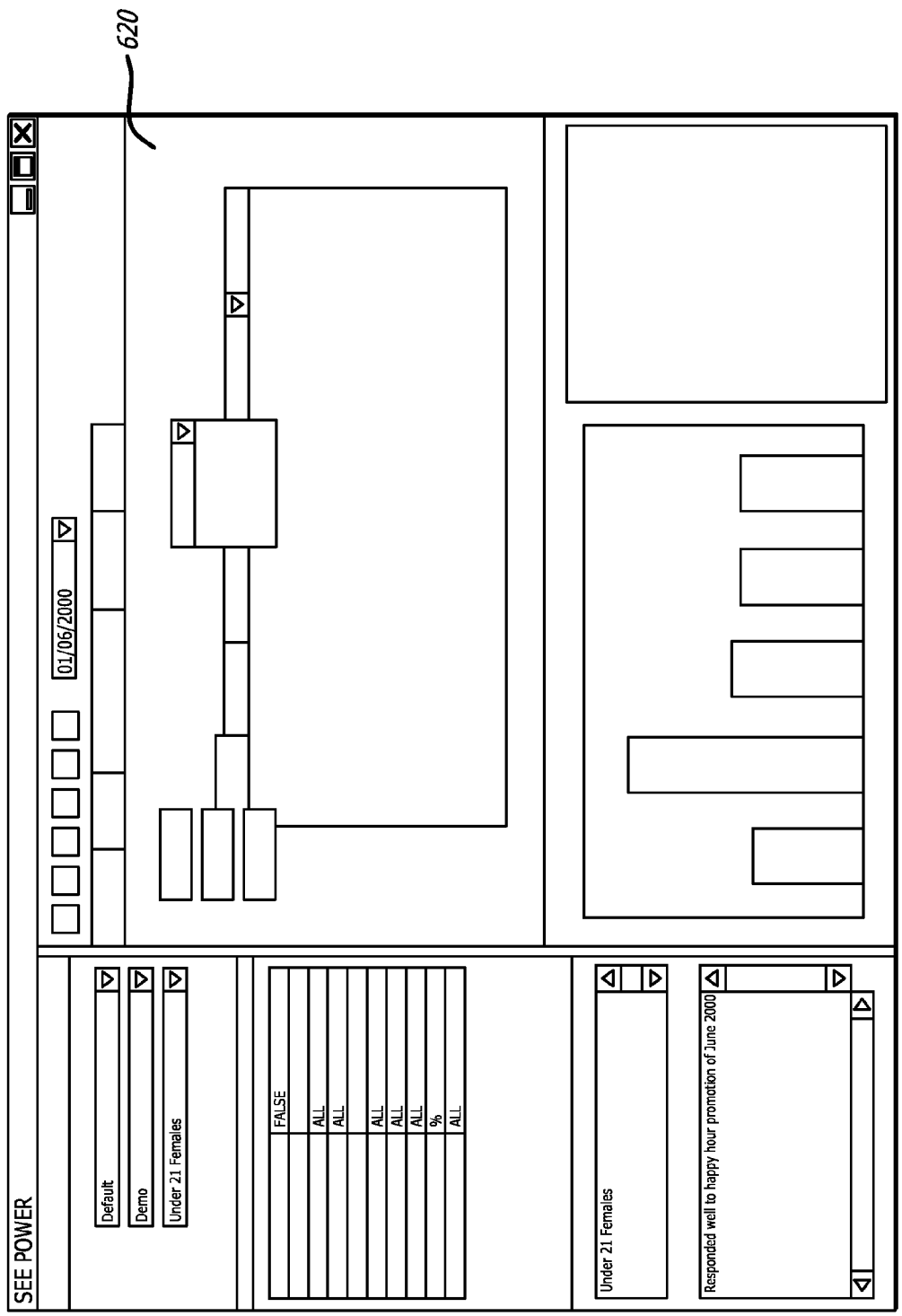

Referring to FIG. 15, the invention could display in panel 620 a pre-defined query called leavers and joiners, which would enable a merchant to identify those customers who have left, joined or remained in a profile over a predefined time interval by performing the appropriate set operations on two snapshots of the profile.

Figure 16:
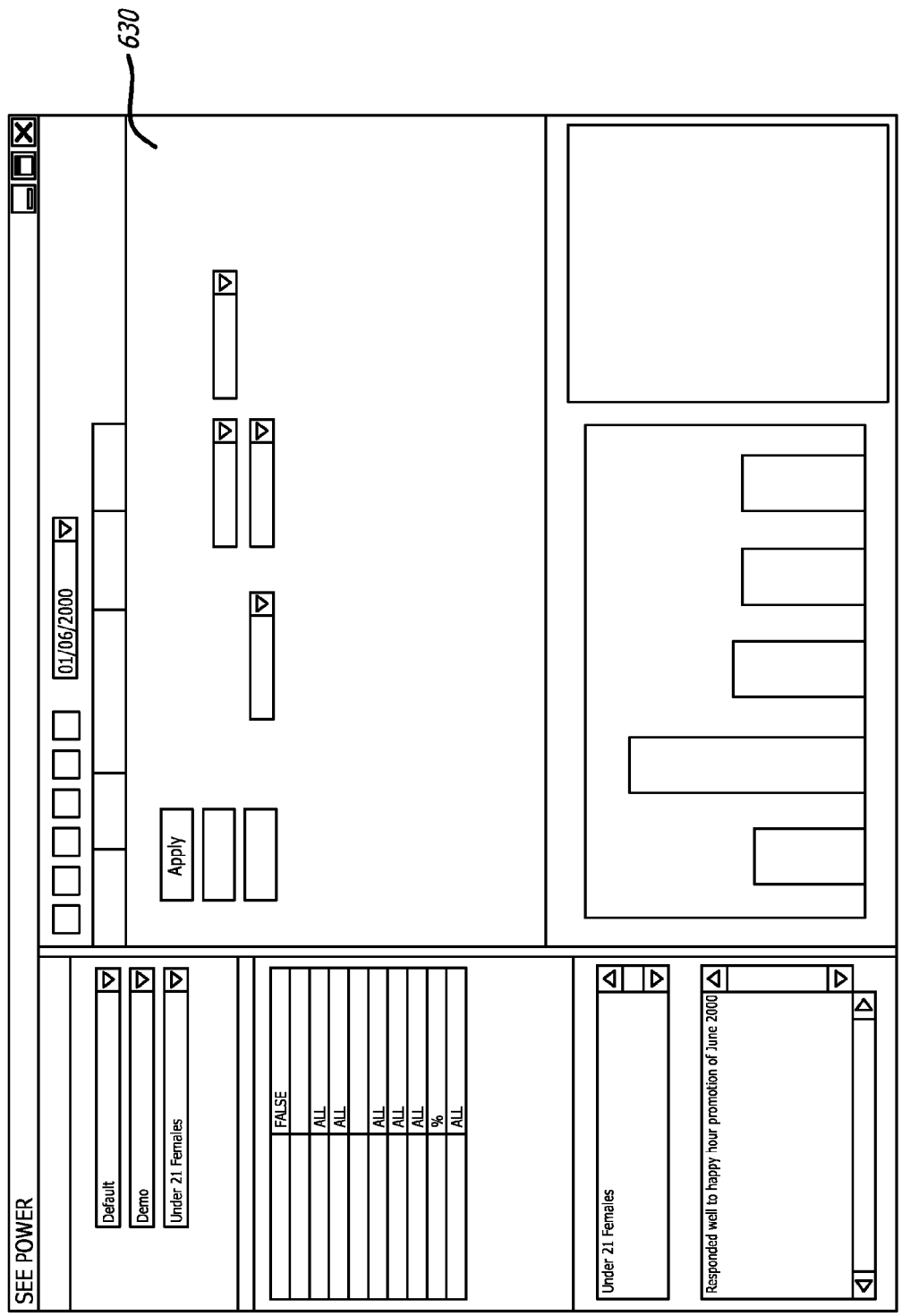

Alternatively, as shown in FIG. 16, panel 630 could display the results of a further query enabling a user to identify members of a profile who have visited more or less than a certain threshold number of times, or who have spent more or less than a threshold amount during a time period, over an arbitrary time period. Such members could be the subject of a further promotion.

In summary, be invention provides a customer relationship management system and method designed to assist a merchant to manage campaigns involving customers of that merchant. The invention provides a system and method of selecting customers to include in a campaign and a system and method for evaluating the effectiveness of that campaign. The invention also enables a user to track changes in customer habits over time. The foregoing describes the invention including preferred forms thereof. Alterations and modifications as will be obvious to those skilled in the art are intended to be incorporated within the scope hereof, as defined by the accompanying claims.

Finally, it is to be appreciated that the invention has been described hereabove with reference to certain examples or embodiments, but that various additions, deletions, alterations and modifications may be made to those examples and embodiments without departing from the intended spirit and scope of the disclosed embodiments. For example, any element or attribute of one embodiment or example may be incorporated into or used with another embodiment or example, unless to do so would render the embodiment or example unpatentable or unsuitable for its intended use. Also, for example, where the steps of a method are described or listed in a particular order, the order of such steps may be changed unless to do so would render the method unpatentable or unsuitable for its intended use. All reasonable additions, deletions, modifications and alterations are to be considered equivalents of the described examples and embodiments and are to be included within the scope of the following claims.

The various embodiments described above are provided by way of illustration only and should not be construed to limit the disclosed embodiments. Those skilled in the art will readily recognize various modifications and changes that may be made to the disclosed embodiments without following the example embodiments and applications illustrated and described herein, and without departing from the true spirit and scope of the disclosed embodiments, which is set forth in the following claims.

What is claimed is:

1. A method of analyzing customer relationships in response to promotional efforts, the method comprising:
   providing a wagering service at a gaming facility in which a number of gaming machines are positioned at a common venue that enables gaming activity between patrons and the gaming facility;
   providing a server that includes an interaction database that stores interaction data, wherein the interaction data includes gaming activity and patron information;
   accessing data from the server, using a data retrieval system, based on patron information that includes personal characteristics;
   defining a promotional group of the patrons stored in the interaction database to which promotional efforts are directed, wherein the promotional group of patrons is defined using the personal characteristics of the patrons;
   defining a control group of the patrons stored in the interaction database to which promotional efforts are not directed, wherein the control group of patrons is defined using the personal characteristics of the patrons, wherein the patrons in the promotional group and the patrons in the control group have all engaged in gaming activity with the gaming facility;
   initiating promotional efforts only to the promotional group of the patrons, which enables the control group to be useful in assessing effectiveness of the promotional efforts;
   enabling retrieval and analysis of data from the interaction database, using a promotional analyzer, related to gaming activity involving patrons in the promotional group after the promotional efforts; and
   presenting a representation of the retrieved interaction data using a display.

2. The method of claim 1, wherein the characteristics used to define the promotional group and the control group include spending habits, visit frequency, and combinations thereof.

3. The method of claim 1, wherein the representation of the retrieved interaction data includes a spatial representation of an area of the gaming facility that shows a layout of individual gaming machines.

4. The method of claim 3, wherein the spatial representation of the gaming machines at the gaming facility show representations of the interaction data as contours around or adjacent to the gaming machines.

5. The method of claim 4, wherein the representations of the interaction data as contours include data points with X and Y coordinates.

6. The method of claim 4, wherein the representations of the interaction data as contours include data points with X, Y, and Z coordinates.

7. The method of claim 4, wherein the representations of the interaction data as contours are color-coded.

8. The method of claim 1, wherein the promotional analyzer corrects for effects external to the promotion.

9. The method of claim 8, wherein the effects external to the promotion include holidays, weather, general economy, and combinations thereof.

10. A method of analyzing customer relationships in response to promotional efforts, the method comprising:
    providing a wagering service that enables gaming activity between patrons and a gaming facility;
    providing a server that includes an interaction database that stores interaction data, wherein the interaction data includes gaming activity and patron information;
    accessing data from the server, using a data retrieval system, based on patron information that includes personal characteristics;
    defining a promotional group of the patrons stored in the interaction database to which promotional efforts are directed, wherein the promotional group of patrons is defined using the personal characteristics of the patrons;
    defining a control group of the patrons stored in the interaction database to which promotional efforts are not directed, wherein the control group of patrons is defined using the personal characteristics of the patrons, wherein the patrons in the promotional group and the patrons in the control group have all engaged in gaming activity with the gaming facility;
    initiating promotional efforts only to the promotional group of the patrons;
    enabling retrieval of data from the interaction database, using a promotional analyzer, related to gaming activity involving patrons in the promotional group after the promotional efforts; and
    presenting a representation of the retrieved interaction data using a display.

11. The method of claim 10, wherein the characteristics used to define the promotional group and the control group include spending habits, visit frequency, and combinations thereof.

12. The method of claim 10, wherein the promotional analyzer corrects for effects external to the promotion.

13. The method of claim 12, wherein the effects external to the promotion include holidays, weather, general economy, and combinations thereof.

14. A method of analyzing customer relationships in response to promotional efforts, the method comprising:
    providing a wagering service that enables gaming activity between patrons and a gaming web site;
    providing a server that includes an interaction database that stores interaction data, wherein the interaction data includes gaming activity and patron information;

accessing data from the server, using a data retrieval system, based on patron information that includes personal characteristics;

defining a promotional group of the patrons stored in the interaction database to which promotional efforts are directed, wherein the promotional group of patrons is defined using the personal characteristics of the patrons;

defining a control group of the patrons stored in the interaction database to which promotional efforts are not directed, wherein the patrons in the promotional group and the patrons in the control group have all engaged in gaming activity with the gaming web site, and initiating promotional efforts only to the promotional group of the patrons;

enabling retrieval and analysis of data from the interaction database, using a promotional analyzer, related to interactions involving patrons in the promotional group after the promotional efforts; and presenting a representation of the retrieved interaction data using a display.

15. The method of claim 14, wherein the characteristics used to define the promotional group and the control group include spending habits, visit frequency, and combinations thereof.

16. The method of claim 14, wherein the promotional analyzer corrects for effects external to the promotion.

17. The method of claim 16, wherein the effects external to the promotion include holidays, weather, general economy, and combinations thereof.

* * * * *